Feb. 2, 1960 T. SHAPIN, JR 2,923,921

AUTOMATIC SEARCHING SYSTEM

Filed June 23, 1954 3 Sheets-Sheet 1

Inventor
Theodore Shapin, Jr.
by Carlson, Pitzner, Hubbard & Wolfe
Att'y's

AUTOMATIC SEARCHING SYSTEM

Filed June 23, 1954 3 Sheets-Sheet 2

Inventor
Theodore Shapin, Jr.
by Carlson, Pitzner, Hubbard & Wolfe
Att'ys

AUTOMATIC SEARCHING SYSTEM

Filed June 23, 1954 3 Sheets-Sheet 3

Inventor
Theodore Shapin, Jr
by Carlson, Pitzner, Hubbard & Wolfe
Att'y's 2,923,921

AUTOMATIC SEARCHING SYSTEM

Theodore Shapin, Jr., Chicago, Ill.

Application June 23, 1954, Serial No. 438,841
8 Claims. (Cl. 340—174)

The present invention relates in general to systems for automatically searching through a great number of documents and locating certain selected ones. More particularly, the invention is concerned with the rapid searching and automatic location of reduced-size document facsimiles which are so small as to preclude quick visual inspection of identifying or classifying marks.

In recent years, the numbers of books, theses, drawings, business records and other like documents held in libraries, schools, and offices have increased to such an extent that a critical problem of adequate storage space has been created. The difficulty is being overcome to a large extent, however, through the employment of various kinds of equipment for making reduced-size facsimiles of the documents which require only a fraction of the storage space necessary for the originals. An exemplary technique for creating such reduced-size facsimiles is the familiar "microfilming" process where each document is photographed on one frame of long film strips wound compactly on reels. Each document may be inspected by employing an enlarging projector, or reproduced in its original size by well-known photography practices.

A great difficulty tending to prevent more wide-spread use of such reduced facsimiles lies in the tedious effort necessary to locate a selected document or class of documents from among thousands compactly stored together. If all of the documents must be visually inspected in order to locate those dealing with a certain subject by placing the facsimiles successively in an enlarging viewer, the saving in storage space is offset by the inconvenience of access. Even where facsimiles can be placed in numerical or chronological order of their documentary content, a "stop-and-look" searching operation is necessary to locate a given one.

It is to the solution of this searching difficulty that the present invention is directed, the general aim being the provision of a novel searching system which employs identifying indicia recorded on the facsimile medium and means operative to electrically sense such indicia and automatically locate selectable ones of the facsimiles.

Another object of the invention is to provide such a system in which reduced-size facsimiles are identified by coded indicia recorded thereon which is susceptible of being rapidly sensed by electrical means. Coordinate with such object, it is still another object to provide means for temporarily storing the resulting signals, together with an arrangement for comparing them with an electrical representation of the coded indicia on the facsimiles to be located, correspondence of the stored signals and electrical representations resulting in termination of the searching to place the desired facsimile in a predetermined position.

A further object is the provision in such a searching system of means for recording identifying indicia on a very small area of the facsimile medium, together with means for accurately and rapidly "reading" the indicia as searching progresses. In this connection, it is contemplated that the indicia identifying each facsimile be digital, and preferably binary, in form, electrical signals resulting from the reading of the indicia being handled by fast-acting electronic storing and comparing circuits.

Still another object of the invention is to provide such a searching system for automatically locating a selected frame or group of frames in a film strip by utilizing magnetically recorded binary digital indicia for identifying the subject matter photographically stored in each frame of a film strip according to a predetermined code.

In the accomplishment of the foregoing objectives, it is intended further to provide such a searching system employing a shifting register serving both as a storage and counting means, thereby substantially reducing the required area on the facsimile medium for the stored indicia and the number of required electronic components.

Still further, it is an object to provide a searching system in which the documentary content of any one facsimile falling in two or more classifications may be identified for each such classification, together with means for locating that facsimile when the searching system is set to locate facsimiles relating to any one of the classifications. By way of example, a document might be classified both by author and subject matter. By appropriate set-up of the searching system to locate documents either by that author or dealing with that subject matter, the particular document facsimile will be turned up.

Other objects and advantages will become apparent as the following description proceeds, taken in conjunction with the accompanying drawings, in which.

While the invention has been shown and is described in some detail with reference to a particular embodiment thereof, there is no intention that it thus be limited to such detail. On the contrary, it is intended here to cover all alterations, modifications, and equivalents falling within the spirit and scope of the invention as defined by the appended claims.

Figure 1:
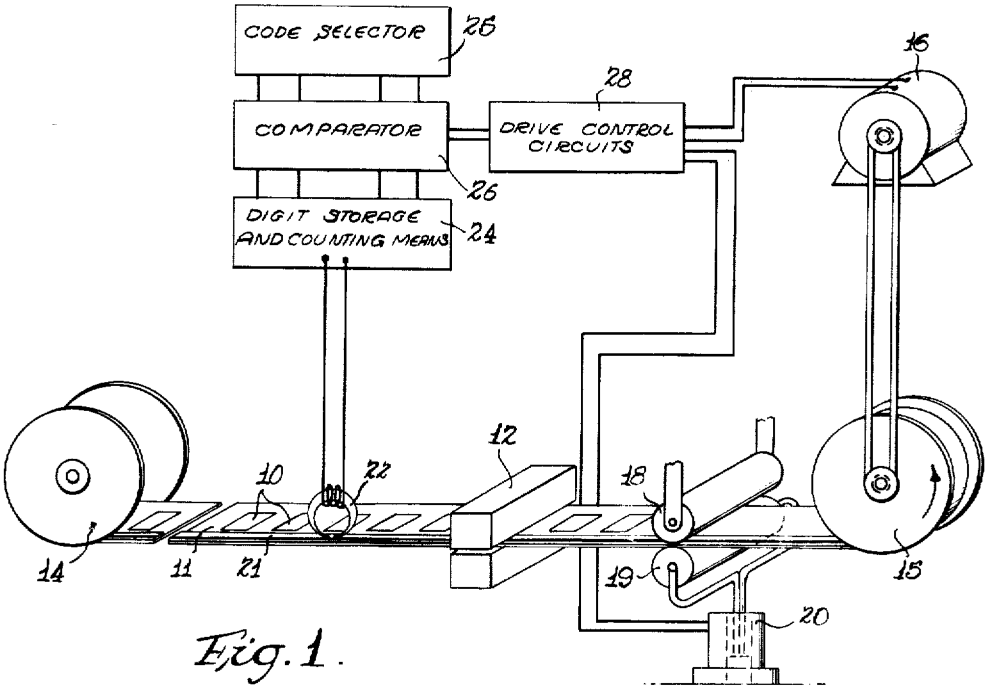
Figure 1 is a schematic perspective illustration of a searching system embodying the features of the invention, the electrical components thereof being shown in block-and-line form.

Referring now to the drawings, and initially to Fig. 1, the illustrated searching system is intended to locate automatically selected ones of a plurality of reduced-size document facsimiles which in the present instance are in the form of a plurality of frames 10 longitudinally spaced along a film strip 11. Each of the frames 10 is a reduced photographic negative of one of the documents, a single strip or reel of 16 mm. film being adequate to record the contents of a great many ordinary size documents. For inspecting or reproducing in full size the documentary content photographically recorded in each of the frames 10, an optical viewer 12 may be employed together with means for feeding the film strip 11 along a path adjacent the viewer.

The viewer 12 itself may take a variety of forms. For example, it may be an enlarging projector, a camera, or a television pick-up tube. The feeding means for the film strip 11 include supply and take-up reels 14, 15 on which the film may be wound, the take-up reel being driven at a rapid speed by a suitable drive motor 16 controlled in a manner to be more fully decribed. In order that the film strip 11 may be quickly halted when the motor 16 is deenergized, a pair of brake rollers 18, 19 embrace the strip 11, the former being stationary and the latter being adapted for clamping engagement with the strip in response to the energization of a solenoid 20.

In accordance with the invention, means are provided on the facsimile medium or film strip 11 for receiving recorded indicia identifying the contents of each of the frames 10 according to a predetermined code system. As illustrated in this instance, a narrow track or layer 21 of magnetically retentive material is bonded along one edge of the film strip 11. While various other methods and materials may be employed on the facsimile medium for receiving coded, identifying indicia, it has been found that the use of the magnetic layer 21 is particularly advantageous in that it requires a very small area on the film strip and may record a relatively great quantity or amount of indicia, in the form of residual flux, in such small area. Thus, by electromagnetically influencing adjacent segments or spots of the magnetic layer 21, the residual magnetism retained in the material may be employed to repeatedly produce electric signals corresponding to the indicia through the employment of an electromagnetic transducer or play-back head.

In the preferred form of the invention, the coding system for identifying the contents of each of the facsimiles or frames 10 is one which uses a binary digital "word," each word consisting of a predetermined number of digit places, e.g., 40 digit places, located successively and longitudinally along the magnetic layer 21. The identifying word for a particular frame 10 may be located directly opposite that frame or displaced longitudinally along the film by a predetermined distance, as may be desired. Each "word" identifies the contents of its document facsimile by the presence or absence of a selected one of two values in a predetermined pattern of selected digit places. For example, in a 40 digit word, all documents written by an author named "Shaw" might be identified by the presence of a binary "1" in the first, fifth, and tenth digit places, while all documents containing subject matter dealing with historical drama might be identified by the presence of binary "1" in the second, eleventh, and sixteenth digit places, there being binary "0's" recorded in the remaining digit places.

By arbitrary choice, binary "1's" may be represented by a spot of positive residual flux recorded into the proper space along the magnetic layer 21, while a binary "0" is represented by a spot of negatively polarized residual flux. With 40 digit places in each identifying binary digital "word," and by using only three such digit places to represent a given subject, author, date etc., it is possible with the many combinations or "words" to catalogue a great number of document facsimiles according to a wide range of classifications.

Further, by the exemplary coding system described above it is possible to classify a given document in two or more groups by superimposing the codes for these groups. That is, a document facsimile written by the author "Shaw" and pertaining to "historical drama" could have positively polarized residual flux recorded in the first, second, fifth, sixth, tenth and eleventh digit places of its 40 digit word. Thus, whether the searching system were set to select document facsimiles written by "Shaw" or documents facsimiles pertaining to "historical drama," that particular facsimile would be located automatically each time.

It is but a simple matter to record positively and negatively polarized spots of residual flux along the length of the magnetic layer 21 by known magnetic recording practices. After the subject matter code has been selected, a classifier may simply run the film through a viewer, pausing to inspect each document facsimile and energizing a recording magnetic head to produce the necessary positively polarized magnetic spots in the proper digit places, all other digit places being recorded with negatively polarized magnetic residual flux.

In keeping with the invention, provision is made for manually initiating rapid feed of the film strip 11, for electrically sensing the indicia on the film strip as it is moved and for terminating the feeding of the film strip when a sensed binary "word" agrees with that set up on a selector device, thereby placing the selected frame opposite the viewer 12. For this purpose, a transducer or reading head 22 is disposed adjacent the path of the film strip 11 and the magnetic layer 21, the reading head being adapted to sense the indicia and to provide an output train of electric pulses representative of the sensed indicia. In the present instance, the reading head 22 is an electromagnetic pick-up head which is of the type familiar to those skilled in the art of magnetic recording. As each "word" indicia in the magnetic strip 21 passes beneath the head 22, the residual flux induces related voltages in a coil included on the head 22. Thus, a train of electric signals spaced in time according to the physical spacing of the digit places in the word is supplied by the reading head 22.

In order to utilize such electric pulses to terminate the feed of the film strip 11 whenever the selected document is disposed opposite the viewer 12, the pulses are supplied to digit storage and counting means 24. The organization and operation of the preferred form of such storage and counting means 24 will be more fully described below. At the present time it is sufficient to note that such storage and counting means operate to temporarily store each "word" pulse train produced by the magnetic reading head 22. Further, when an entire word has been temporarily stored and has served its purpose for comparison with code selector signals, it is automatically "erased" from the storage means in response to a count of pulses equal in number to the digit places present in each of the identifying "words."

For electrically representing the binary digital "word" of those facsimile documents which are to be automatically located by the searching system, a code selector 25 is provided. This may include means for manually setting up binary "1's" or "0's" by means of manual switches, or for automatically setting up such words by punched cards operative to open and close certain ones of a plurality of switches. In essence, however, the code selector 25 includes a plurality of output terminals each of which may be made to have one of two voltage levels thereby representing either a binary "1" or a binary "0" in one digit place of a multi-digit binary "word." The number of digit places or output terminals for the code selector 25 corresponds to the number of digit places in each of the identifying "words" represented by the indicia recorded on the magnetic layer 21.

When a word has been fully stored in the storage and counting means 24, a comparator 26 interconnected between the storage and counting means 24 and the code selector 25 then automatically becomes operative and compares the stored and represented binary digital "words," and only in the event of agreement of the compared words supplies an output signal to drive control circuits 28. In response to such signal, the drive control circuits 28 deenergize the drive motor 16 and energize the brake solenoid 20 to bring the film strip 11 to a quick stop, the selected frame thereby being disposed opposite the viewer 12 for inspection or reproduction as the case may be.

Figure 2:
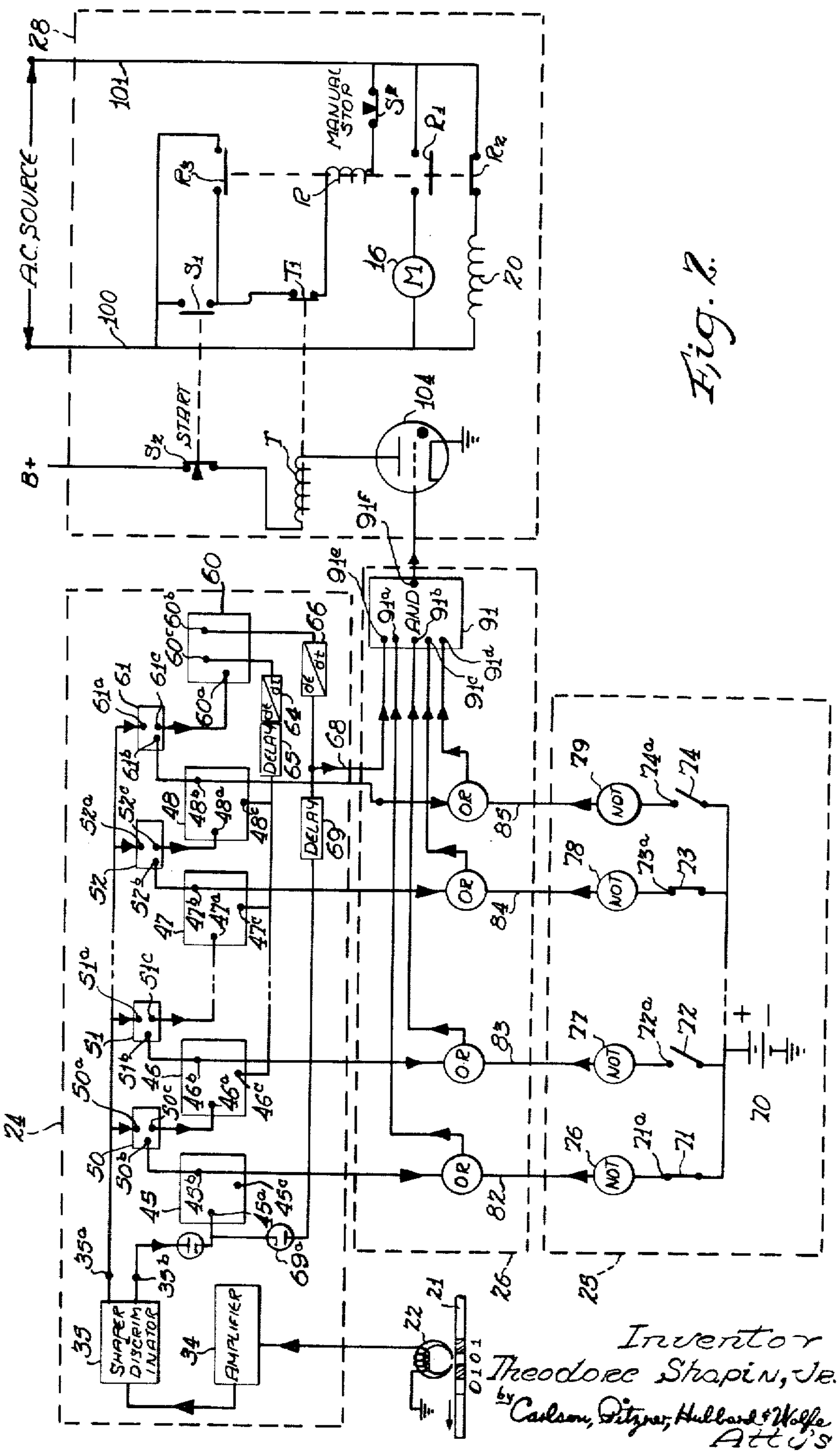
Fig. 2 is a schematic circuit diagram, partially in block-and-line form, of the searching system shown in Fig. 1.

Turning next to Fig. 2, the electrical circuitry for the exemplary embodiment of the searching system is there shown in more detail, although partly in block-and-line diagram form. For purposes of explanation in the present case, positive flux polarization and a relatively great positive voltage will be taken to represent a binary "1," while negative flux polarization and a smaller positive or zero voltage will be taken as representative of a binary "0." It will be understood, however, that any system employing two discrete levels of a variable signal may be employed for the binary representation.

As shown in Fig. 2, the magnetic layer 21 on the film strip 11 is fed past the stationary reading head 22 when the motor 16 is energized. In the present instance, intervals of the magnetic layer 21 corresponding to each frame 10 in the film strip 11 are divided longitudinally into a plurality of "spots" equal in number to the digit places in the binary "words" accommodated by the system. While this number of digit places may be made as great as necessary, within the limits of the magnetic layer 21 and the reading head 22 to faithfully reproduce recorded signals, a system handling only four digit places is illustrated for the sake of simplicity. It will be understood, however, that forty or more digit places may be contained in an interval of the magnetic layer 21 equal in length to one frame on ordinary 16 mm. film. Dashed connections in Fig. 2 indicate that additional stages or digit handling circuits may be employed as desired by following the general organization to be described.

Each of the spots in a "word" on the magnetic layer 21 is impressed with residual flux indicia, positive in polarity to represent a "1" and negative in polarity to represent a "0." In Fig. 2, the binary "word" for one frame as recorded on the layer 21 is indicated as "0101," where the darkened portions represent positive residual flux. Thus, the flux passing the reading head 22 may be represented in time as shown by a curve 30 in Fig. 6, the alternate negative and positive portions 30*a*—*d* corresponding to the successive binary values "0101." As a result, a train of voltage pulses is induced in the winding of the reading head 22, such train being diagrammatically illustrated by a curve 32 in Fig. 6. Due to the fact that electromagnetically induced voltage is directly related to the rate of change of flux linkage with the winding, the negative flux spots 30*a* and 30*c* produce double voltage pulses having negative pips 32*a*— and 32*c*— followed immediately by positive pips 32*a*+ and 32*c*+, respectively. Correspondingly, the positive flux spots 30*b*, 30*d* produce positive voltage pips 32*b*+, 32*d*+ followed by negative pips 32*b*— and 32*d*—, respectively.

Returning again to Fig. 2, the voltage pulse train 32 induced in the reading head 22 is supplied to the digit storage and counting means 24, first through an amplifier 34 included in the latter and thence to a pulse shaper and discriminator 35. The latter has two output terminals 35*a* and 35*b*, and includes electronic circuitry operative in a manner familiar to those skilled in the art to produce a negative shift pulse for each digit place in the voltage train 32 and a positive intelligence pulse representing a "1" for each "1" in the voltage train 32. Thus, in the present case, a voltage train 40 (Fig. 6) is supplied on the output terminal 35*a* including shift pulses 40*a*–*d* spaced in time to correspond to each digit place. Secondly, each time that a positive voltage pip immediately precedes a negative voltage pip in the voltage pulse train 32 (e.g., 32*b*+, 32*b*— and 32*d*+, 32*d*—) positive pulses 41*b* and 41*d* are created on the output terminal 35*b* as indicated by the curve 41 in Fig. 6.

In order to both store the binary "word" represented by the output voltage 41 (in which a "1" is represented by a positive pulse and a "0" by the absence of the pulse) and to count the number of digit places so that it may be ascertained when a complete "word" has been received, a shifting register is provided which is more or less conventional in organization. Briefly, this shifting register, in the present instance shown as capable of storing a four digit word, comprises four bi-stable elements interconnected by transfer units. While the storage units may be relays, for example, in the preferred form they are electronic Eccles-Jordan type flip-flop circuits 45—48 capable of rapid triggering from relatively low amplitude input pulses. Such flip-flop circuits are well-known to those skilled in the art and need not be described in detail.

It will be sufficient to note that these circuits have input terminals 45*a*—48*a*, output terminals 45*b*—48*b*, and reset terminals 45*c*—48*c*. Each has two possible conduction states providing, respectively, a relatively high or low positive potential at its output terminal. In the present instance, these two potential levels are taken to represent a binary "1" and "0" respectively. A negative voltage pulse supplied to the reset terminals 46*c*—48*c* places the flip-flops 46—48 in the "0" state, while a positive voltage pulse supplied to the input terminal 45*a* of the flip-flop 45 places the latter in the "1" state.

Three transfer units 50–52 are interconnected between the flip-flop circuits 45—48 in the manner shown. These transfer units, which include delay lines, and their operation will be familiar to those skilled in the art. Briefly, they have respective input terminals 50*a*—52*a* all connected to the terminal 35*a* to receive the shift pulses represented by the curve 40, second terminals 50*b*—52*b* connected to the respective flip-flop output terminals 45*b*—47*b*, and output terminals 50*c*—52*c* connected to the respective flip-flop input terminals 46*a*—48*a*.

In operation, each of the transfer units 50—52 passes the shifting pulses 40*a* over its second terminal 50*b*—52*b* to the flip-flop on the immediate left. Each negative shift pulse 40*a* sets that flip-flop to "0," that is, causes no change if the flip-flop already stores a "0," and switches it to "0" if it previously held a "1." In the latter case, the change in potential at the flip-flop output terminal creates a voltage pulse which is sent through time delay means in the transfer unit and thence over the output terminal 50*c*—52*c* to the succeeding flip-flop input terminal. This results in the succeeding flip-flop being triggered to its "1" state. The over-all operation is therefore such that the binary number in each flip-flop is "shifted" to the succeeding flip-flop on the right in response to each of the shifting pulses 40*a*.

For determining when a complete binary "word" has been shifted into the register, the first flip-flop 45 is originally given a conduction state representing a "1," while the remaining flip-flops 46—48 are in the "0" state. Sensing of a full register, actuation of the comparator 26 and resetting of the register are accomplished by means which include a mono-stable or "one-shot" multivibrator 60 together with another transfer unit 61. The transfer unit 61 is connected to the shift pulse terminal 35*a*, the last flip-flop 48, and the input of the multivibrator 60.

The mono-stable multi-vibrator 60 will be familiar to those skilled in the art and need not be described in detail. Briefly, it includes an input terminal 60*a* and two output terminals 60*b*, 60*c*. These normally are at high and low voltage levels, respectively, but upon the reception of a triggering pulse of proper polarity on the input terminal 60*a* they "switch" voltage levels for a short predetermined time interval. At the end of this time interval, the terminals 60*b*, 60*c* automatically revert back to their original voltage levels.

The return of the output terminal 60*c* from the high potential to the low potential, acting through a differentiating circuit 64 and a delay line 65, supplies a negative voltage pulse to the reset terminals 46*c*—48*c*; and in a similar manner the return of the output terminal 60*b* from the lower potential to the high potential, acting through a second differentiating circuit 66, supplies a positive voltage pulse to a conductor 68 leading to the comparator 26. This same pulse passes through a second delay circuit 69 and a buffer diode 69*a* to the input terminal 45*a*.

The negative pulse supplied to the reset terminals 46*c*—48*c* assures that the flip-flops 46—48 are returned to or left in their "0" state, while the positive pulse supplied to the input terminal 45*a* assures that the flip-flop 45 is returned to or left in its "1" state, as the case may require. Before this takes place, however, the positive pulse supplied over the conductor 68 to the comparator 26 actuates the latter and, in a manner to be explained, causes termination of the film drive if, and only if, the binary "word" stored in the register that instant corresponds to the selected code of the frame or one of the frames to be located.

The operation of the storage and counting means 24 may thus be briefly summarized as follows. In response to each input voltage "word" train such as represented by the curve 32 (Fig. 6), a train of shifting pulses 40, each pulse spaced in time, is supplied to the transfer units 50—52 and 61. Immediately following each shift pulse, a positive voltage pulse is supplied to the input terminal 45*a* of the first flip-flop 45 only if the value recorded in the corresponding digit place of the magnetic layer 21 is a "1." Thus, with the register initially storing the binary number "1000," where the "1" in the first digit place is a marker, the first shift pulse 40*a* transfers the stored digit values one place to the right. The binary number held by the register is then "0100." Pursuing the example illustrated by the curves in Fig. 6, no input pulse to the flip-flop 45 follows the first shift pulse inasmuch as the binary number read from the film strip 11 is "0101" from left to right. The second shift pulse 40*b* sets up the register to store "0010," and the subsequent intelligence pulse 41*b* triggers the flip-flop 45 to the "1" state, making the reading "1010." The third shift pulse 40*c* transfers each stored digit one place to the right, creating "0101"; the storage unit 45 remains in the "0" state due to the asbence of an intelligence pulse. Finally, the fourth shift pulse 40*d* makes the register hold "0010" and transfers the marker "1" to the monostable multi-vibrator 60. While the latter remains for a predetermined time interval in its unstable state, the last intelligence pulse 41*d* triggers the flip-flop 45, so that the register then stores "1010" from left to right—the binary "word" recorded in the magnetic layer 21.

Thereafter, the multi-vibrator 60 automatically returns to its stable state, supplying a positive pulse over line 68 to the comparator 26 and shortly thereafter, due to the delay circuits 65 and 69, a negative pulse to the reset terminals 46*c*—48*c* and a positive pulse to the input terminal 45*a*. These return the register to the original reading of "1000," making it ready to receive the next binary "word" from the film strip 11.

During the short time interval occasioned by the delay circuits 65 and 69, the comparator 26 is actuated by the pulse received over the line 68. If the binary number in the storage register has a "1" in all of the digit places for which there is a "1" represented by the code selector 25, the comparator 26 supplies a signal to the drive control circuits 28, causing the latter to terminate feed of the film strip 11.

In order to effect this operation, the code selector 25 includes suitable means for electrically representing any binary "word" corresponding to the binary indicia for each frame 10 in the film strip 11. In the simple form illustrated in Fig. 2, the code selector 25 comprises simply a positive voltage source 70 with a plurality of manually operable switches 71—74. The switches have terminals 71*a*—74*a* which when at a positive potential, by virtue of closure of the switch, are taken to represent a binary "1," and when at or about zero potential are taken to represent a binary "0." As illustrated, therefore, when the switches 71 and 73 are closed and the switches 72 and 74 open, they represent the binary word "1010," reading from left to right.

In accordance with one feature of the invention, the code selector 25 also includes a plurality of logical NOT circuits 76—79, connected to the respective terminals 71*a*—74*a*. These circuits are well known to those skilled in the art and are operative to provide a high voltage output in response to a low voltage input and vice versa. In other words, they convert binary "1's" to "0's" and vice versa since "NOT 1" is "0."

Figure 3:
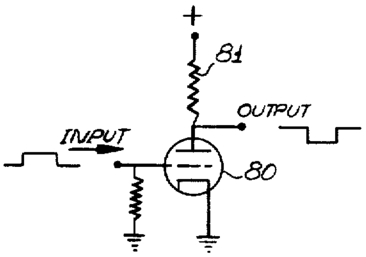
Fig. 3 is a diagram of a typical, logical "NOT" circuit employed in the searching system selector device.

An exemplary simple form of NOT circuit is illustrated in Fig. 3, comprising simply a triode electron discharge device 80 having its anode connected to a positive supply voltage through a load resistor 81. An increase in the input potential to the control grid creates a decrease in potential at the anode or output terminal, and vice versa.

Figure 4:
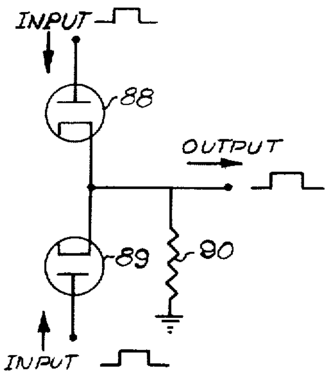
Fig. 4 is a diagram of an exemplary, logical "OR" circuit used in the comparator shown in Fig. 2.

The comparator 26 comprises a plurality of logical OR circuits 82—85, having input terminals connected to the corresponding digit place output terminals 45*b*—48*b* and the NOT circuits 76—79. Briefly, the OR circuits operate to provide a binary "1" output when either one "or" the other (or both) of the two inputs are "1's," and a binary "0" when both inputs are "0's." In the present case, therefore, they provide positive output potentials, representative of a "1," whenever either the corresponding flip-flop circuit or the corresponding NOT circuit supplies a positive potential input. A very simple form of such an OR circuit is shown by way of example in Fig. 4. It comprises two normally cut-off diodes or unidirectionally conductive devices 88, 89 having cathodes connected to ground through a common impedance 90. The two inputs are supplied to the respective anodes and when either (or both) of the anodes is positive, current flows through the impedance 90, creating a positive voltage output.

It will thus be seen that each of the OR circuits 82—85 provides a "1" output if its corresponding flip-flop holds a "1." On the other hand if its corresponding flip-flop stores a "0," it provides a "0" output unless the corresponding NOT circuit supplies a "1," i.e., the corresponding switch is open thereby representing a "0." Thus, for each switch closed to represent a "1" there must be a "1" stored in the corresponding flip-flop before the OR circuit supplies a "1" output. In order to determine when all of the OR circuits supply a "1" or positive voltage output, their several outputs are connected to input terminals 91*a*—91*d* of a logical AND circuit 91. The conductor 68 is connected to a fifth input terminal 91*e*. The AND circuit 91 is operative to supply a positive voltage on its output terminal 91*f* only when all of its input terminals 91*a*—*e* simultaneously receive a relatively high voltage signal. This, of course, occurs only when a positive input pulse is received over the line 68 and then only if all of the OR circuits supply positive voltage inputs at the same time.

Figure 5:
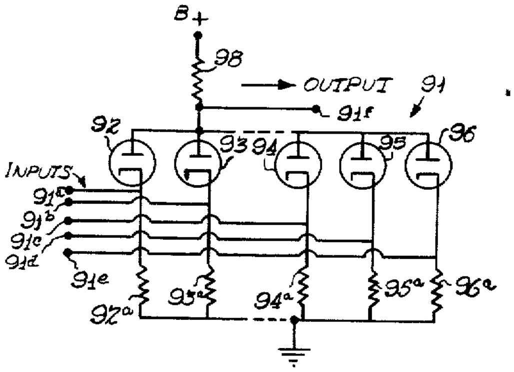
Fig. 5 is a diagram illustrating details of a suitable logical "AND" circuit employed in the comparator.

An exemplary form of logical AND circuit is illustrated in Fig. 5 with more detail. Briefly, this circuit includes a plurality of unidirectionally conductive discharge devices or diodes 92—96 all connected in parallel through individual load resistors 92*a*—96*a* and through a common load resistor 98 leading to a suitable supply voltage source. The several input terminals 91*a*—91*e* are all connected to the cathodes of corresponding ones of the diodes 92—96, while the output terminal 91*f* is taken from the common connection of the resistor 98 with all of the anodes. The circuit parameters are chosen such that all of the diodes 92—96 are normally conductive thereby drawing appreciable current through the load resistor 98 and maintaining the output terminal 91*f* at a relatively low potential. Each of the diodes 92—96 has sufficient current carrying capacity by itself to maintain the output terminal 91*f* at a low potential when that diode is conductive. If relatively great positive potentials are supplied to all of the input terminals 91*a*—91*e*, additional currents are passed through the cathode resistors 92*a*—96*a*, creating a larger voltage drop across these resistors and thus driving the corresponding cathodes more positive in potential. This lowers the voltage drop across all of the diodes 92—96 and causes them to cease conduction. Accordingly, the output terminal 91*f* rises in potential to a value substantially equal to the supply voltage. It will be noted that if four of the input terminals 91*a*—91*e* receive positive voltage inputs, the diode corresponding to the other input terminal will remain conductive, and thus no positive output voltage will appear at the terminal **91*f***.

The drive control circuits 28 are intended to promptly halt the film strip 11 whenever they receive a positive output voltage signal from the AND circuit 91. While such circuits may take a variety of forms, those illustrated in the present instance include alternating current supply conductors 100, 101 across which the drive motor 16 and the brake solenoid 20 are connected through normally open contacts $R_1$ and normally closed contacts $R_2$, respectively, controlled by the relay having a coil R. The coil R is adapted to be energized by closure of normally open contacts $S_1$ of a push-button start switch, a circuit thus being completed from the supply conductor 100 through the contacts $S_1$, normally closed contacts $T_1$, and a normally closed manual stop switch S′ to the supply conductor 101. Normally open contacts $R_3$ controlled by the coil R are connected in parallel with contacts $S_1$ to establish a seal-in circuit. Closure of the switch contacts $S_1$ therefore seals in the relay R to energize the motor 16 and deenergize the brake solenoid 20. The film strip is thus rapidly fed past the reading head 22 and the viewer 12 (Fig. 1). At any time an operator may manually stop the drive of the film strip by depressing the stop switch S′.

In order to deenergize the motor 16 and energize the brake solenoid 20 automatically in response to a positive voltage output from the AND circuit 91, a thyratron 104 is connected to the suitable positive supply voltage through a relay coil T controlling the normally closed contacts $T_1$ and through normally closed contacts $S_2$ of the start switch. Accordingly, whenever a positive pulse is supplied from the output terminal **91*f* to the grid of the thyratron 104, the latter immediately fires and conducts current to energize the coil T. This opens the contacts $T_1$ which in turn deenergize the relay coil R. The latter opens the contacts $R_1$ to deenergize the motor 16 and closes the contacts $R_2$ to energize the brake solenoid 20**.

Once fired, the thyratron 104 continues to conduct until its anode circuit is broken. Thus, with the start switch having the contacts $S_1$ and $S_2$ jointly controlled thereby, conduction of the thyratron 104 is automatically terminated whenever the contacts $S_2$ are momentarily opened at the time the drive of the film strip is initiated.

Figure 6:
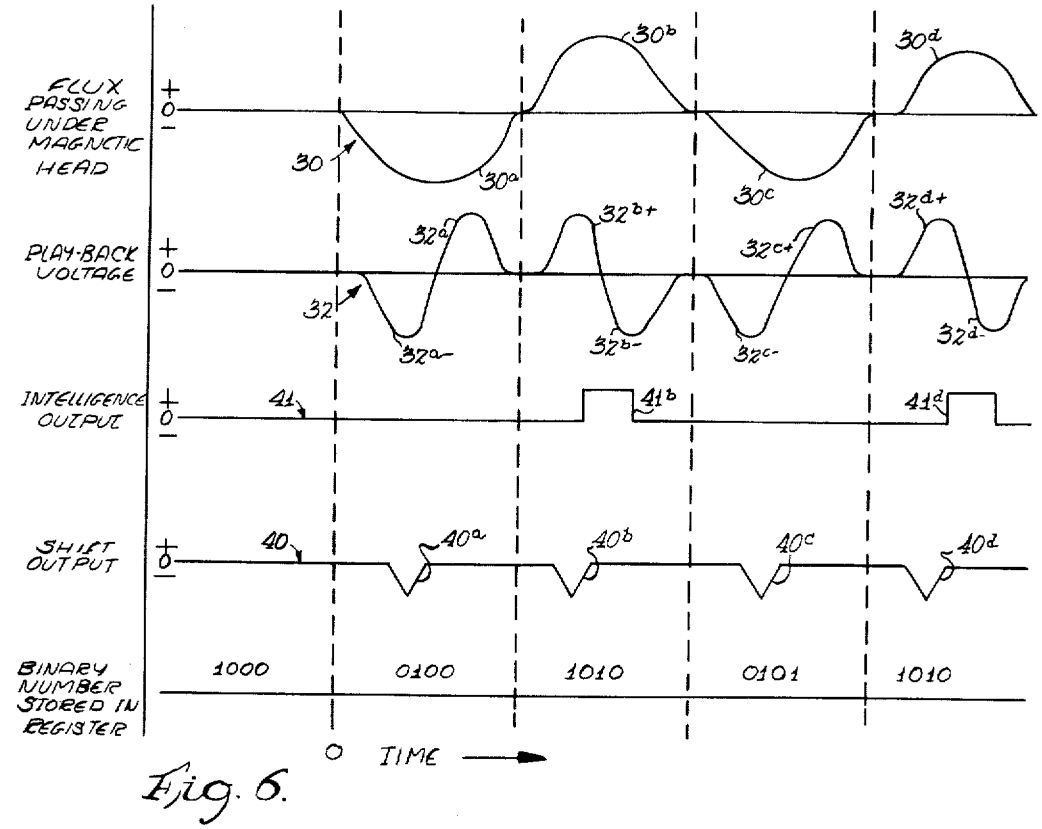
Fig. 6 is a set of curves illustrating the operation of transferring a binary digital voltage train into the storage register employed in the illustrated searching system.
Figure 7:
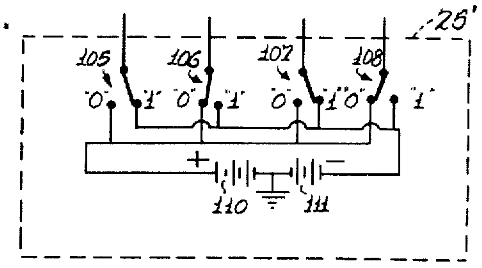
Fig. 7 is a circuit diagram of an alternative form of the selector device shown in Fig. 2.

Referring now to Fig. 7, an alternative, form 25′ of the code selector 25 is there illustrated, which in some applications may be advantageously employed in lieu of that shown in Fig. 2. Briefly, the modified code selector 25′ eliminates the necessity for separate NOT circuits through the provision of a plurality of single pole, double-throw switches 105—108. The double-throw element of each of these switches is intended to serve as an output terminal for connection to one of the inputs of the corresponding OR circuits 82—85 in Fig. 2. Each of these switches has two contacts optionally engageable by the double-throw switch element. One of each such pair of contacts is connected through a positive voltage source 110 to ground, while the remaining contact of each pair is connected through a negative voltage source 111 to ground. The former contacts are designated, in this instance, as "0" contacts, while the latter contacts are designated as "1" contacts. By this arrangement, when each of the switches is thrown to the "1" position, its double-throw element is placed at a negative potential which represents "not 1" and thus represents "0." On the other hand, when each of the switches 105—108 is thrown to the "0" contact, a positive potential is supplied to its double-throw element. This, in the present system, represents "not 0" but "1." Accordingly, the code selector 25′ performs exactly the same as the code selector 25 but with a simplification of components. With the switches 105—108 positioned as shown in Fig. 6, their inputs to the OR circuits 82—85 (Fig. 2) are exactly the same as in the case illustrated for the switches 71—74. Reading from left to right, the switches 105—108 represent the binary number "1010." But they supply "not 1010," i.e., "0101," to the input terminals of the OR circuits 82—85 in Fig. 2.

*Résumé of operation*

While the operation of the automatic searching system is believed to be clear from the foregoing description, a brief résumé may be helpful. When an operator desires to locate a certain frame or frames from a great many constituting reduced facsimiles of a great number of documents in one or more reels of film strip, he first sets the several switches in the code selector 25 to the positions necessary to correspond to the binary "word" recorded as identifying indicia, according to a predetermined code, on the magnetic layer 21 for the desired frame or frames. The start switch is then momentarily depressed to open the contacts $S_2$ and close the contacts $S_1$ (Fig. 2). This cuts off the thyratron 104 if it were previously conducting, energizes the drive motor 16, and releases the solenoid brake 18—19. The film strip 11 will then be driven at a rapid rate past the stationary reading head 22 and the viewer 12.

As each interval along the magnetic layer 21 corresponding to one frame 10 in the film strip 11 passes the magnetic head 22, the magnetically recorded binary indicia will induce related voltage signals in the winding on the head which are transferred into the shifting register and temporarily stored. When the register has received a complete word, an output pulse will be supplied over the line 68 to the AND circuit 91. If all of the OR circuits 82—85 are not at that time supplying positive voltage inputs to the AND circuit, no output signal is supplied to the thyratron 104. This would be true, for example, if the code selector device were set to represent the number "1010" (reading from left to right) and the number stored in the register were "1000." In such case, the NOT circuit 78 would supply a low voltage representative of a binary "0" to the OR circuit 84 and the flip-flop circuit 47 would supply a low voltage representative of a binary "0" to the second input of the OR circuit 84. In such instance, the OR circuit 84 would not supply a positive voltage to the AND circuit 91, so that no output signal to the thyratron 104 would result. Thus, the register would automatically be reset to its original condition and would receive for storage and comparison the binary indicia recorded for the next frame.

This cycle repeats over and over as the film strip 11 is moved past the head 22 until a binary word is stored in the register containing a "1" in each corresponding digit place for the switches in the code selector 25 set to the "1" position. When that condition is fulfilled, the comparator 26 supplies a positive output pulse to tne thyratron 104, since all of the OR circuits supply a positive input voltage to the AND circuit 91 when the positive pulse is received over the line 68. As soon as the thyratron 104 is fired in response to such positive pulse, the motor 16 is deenergized and the brake solenoid 20 is energized to bring the film strip 11 to an abrupt halt with the selected frame disposed beneath the viewer 12.

The film will remain stationary until the operator again depresses the drive start switch. This breaks the anode circuit for the thyratron 104 so that it becomes deionized and the above described searching operation may be repeated to look for a different frame.

It is important to consider one special advantage provided by the present searching system. This advantage lies in the accommodation of "superimposed" coding of the documentary contents of the reduced size facsimiles. To pursue the exemplary simple case employing only four binary digit places, a given document facsimile might be coded according to several different classifications. If the document pertains to "Shaw," "historical drama" and "English literature," these subjects may be designated in the selected code by the respective binary words "010," "0001," "0101." If the code selector 25 is set to represent the first word when it is desired to locate facsimiles containing material on "Shaw," the particular frames will be automatically located beneath the viewer 12. Secondly, if it is desired to locate documents containing material dealing with "historical drama," the code selector 25 may be set to electrically represent "0001" and the same frame will again be automatically placed opposite the viewer 12. Finally, if it is desired to locate documents dealing with the subject of "English literature," the code selector 25 may be set to electrically represent the binary word "0101," and the identical frame will again be placed opposite the viewer 12.

This accommodation of "superimposed" coding arises from the fact that code selector switches set to the "0" position, in the manner described, operate to supply a "1," voltage representation to the corresponding OR circuit in the comparator. Accordingly, the output of that OR circuit will be a positive voltage regardless of whether the corresponding flip-flop stores a "0" or a "1" at the time of comparison. On the other hand, when a given switch in the code selector 25 or 25' is set to the "1" position, then it operates to supply a "0" or negative voltage to the corresponding OR circuit. This means that the AND circuit will not supply an output voltage to the thyratron 104 unless the corresponding flip-flop circuit holds or stores a binary "1" at the time comparison is effected by the passage of a positive voltage pulse over the line 68.

While the invention has been described with reference to a simple system employing circuits for only four digit places per "word," it will be readily understood that by a simple extension of the circuits described, a great many digit places may be employed. This makes possible the coding of a great number of reduced document facsimiles according to a wide variety of subject matters. Each document may be classified as containing several such subject matters. And, whenever the code selector 25 or 25' is set to represent the binary code word for a given subject, all of the document facsimiles relating to that subject will be automatically placed opposite the viewer for inspection or reproduction simply by starting the motor 16 a number of times after each located document facsimile has been inspected or reproduced.

I claim as my invention:

1. A searching system for automatically locating selected ones of a plurality of recorded documents comprising, in combination, a film strip having a plurality of frames each adapted to photographically record one of the documents, a narrow track of magnetic material disposed along a longitudinal edge of said strip and adapted to record binary digital indicia "words" identifying the document recorded in each frame according to a predetermined code, a drive motor for winding said strip from one reel to another, an optical viewer disposed along the path of the strip, a magnetic pick-up head disposed adjacent the strip path and operative to produce a serial time-spaced train of electrical pulses of one characteristic or another for each digit place in the indicia according to whether a "1" or a "0" is recorded in that digit place, a pulse shaper and discriminator responsive to the pulses from said head and having two output terminals for providing a shifting pulse for each digit place and a pulse representative of "1" for each "1" in the recorded indicia, respectively, a shifting register including a plurality of storage units and a plurality of transfer gates connected therebetween, means connecting the first of said terminals jointly to said transfer gates and the second of said terminals to the input of the first storage unit in said register, a reset circuit operative in response to the filling of said register to produce an actuating pulse and a delayed reset pulse to restore said register to its original state, a selector device for electrically representing NOT the binary indicia "word" identifying frames to be located, and OR circuit for each digit place responsive to a "1" in either said register or said selector device, an AND circuit having an input circuit connected respectively to each said OR circuit and an additional input circuit connected to receive said actuating pulse, and means responsive to an output signal from said AND circuit for deenergizing said motor to thereby stop said film strip with a selected frame disposed opposite said viewer.

2. A searching system for automatically locating predetermined ones of a plurality of reduced-size document facsimiles comprising, in combination, means in the shape of a single elongated, narrow strip on each facsimile for receiving identifying recorded indicia consisting of a predetermined number of spots spaced lengthwise along said strip means, a sensing device operative to produce an electric signal corresponding to each indicia spot, means for feeding said strip means on the facsimiles longitudinally and successively past said sensing device so that the electric signals for each facsimile are in the form of a time-spaced serial train, means for temporarily storing the electric signals resulting from the indicia on each facsimile, a selector device for electrically representing the indicia on the predetermined facsimiles to be located, normally inoperative means for comparing the stored signals and the selector representations, means responsive to the reception of a number of signals in said storing means equal to said predetermined number of spots for rendering said comparing means operative, means controlled by said comparing means for terminating the feeding of the facsimiles when the compared signals and representations correspond, and means for resetting said storing means automatically after it has received a number of electric signals equal to the predetermined number of spots on each facsimile.

3. A searching system for automatically locating predetermined ones of a plurality of reduced-size document facsimiles comprising, in combination, an elongated, narrow magnetic strip on each facsimile adapted to receive discrete digital indicia consisting of a predetermined number of magnetic spots identifying that facsimile according to a predetermined code, a sensing device operative to convert each magnetic spot into a corresponding digital electric signal, means for feeding the magnetic strip on the facsimiles successively past said sensing device so that the electric signals are in the form of a time-spaced serial train, means for temporarily storing the digital electric signals from the indicia on each facsimile, a selector device for electrically representing the digital code of the facsimiles to be located, means actuated in response to the reception of a number of electric signals equal to said predetermined number for comparing the stored signals and the selector representations, and means operative to terminate feeding of the facsimiles when the compared signals and representations correspond.

4. A searching system for automatically locating predetermined ones of a plurality of reduced-size document facsimiles photographically recorded on the frames of a film strip comprising, in combination, a single narrow strip of magnetic material disposed longitudinally along one edge of the film strip and adapted to receive magnetically recorded binary digital indicia in the form of a predetermined number of magnetic spots for identifying each facsimile according to a predetermined code, an electromagnetic transducer operative to convert each magnetic spot into a corresponding binary digital electric signal, means for feeding the film strip longitudinally and the magnetic strip longitudinally past said transducer so that the electric signals are in the form of a time-spaced train of serial pulses, means for temporarily storing the binary digital electric signals resulting from the indicia on said magnetic strip, a selector device for electrically representing the coded indicia for the facsimiles to be located, means for comparing the stored signals and the selector representations, means responsive to the reception of a number of pulses in said storing means which is equal to said predetermined number for actuating said comparing means, and means controlled by said comparing means for terminating the feeding when the stored signals and selector representations correspond.

5. A searching system for automatically locating predetermined ones of a plurality of reduced-size document facsimiles comprising, in combination, means in the shape of a single, narrow strip located along an edge of each facsimile adapted to receive recorded binary digital indicia in the form of a predetermined number of spots identifying that facsimile according to a predetermined code, a sensing device operative to serially scan the indicia and provide a serial output train of time-spaced binary electrical signals each corresponding to one of the indicia spots, means for feeding the facsimiles successively past said sensing device, a shifting register having a digit capacity equal to said predetermined number and connected to receive and temporarily store said signals, a selector device for electrically representing in binary form the coded indicia on the facsimiles to be located, normally inoperative means for comparing the stored binary signals in said register and the binary representations of said selector device, means responsive to the filling of said shifting register for momentarily rendering said comparing means operative, and means responsive to said comparing means for terminating the feeding when stored signals and representations correspond.

6. A searching system for automatically locating predetermined ones of a plurality of reduced-size document facsimiles comprising, in combination, means on one edge of each facsimile adapted to receive recorded binary digital indicia in the form of a predetermined number of spots identifying that facsimile according to a predetermined code, a sensing device, means for feeding the facsimiles past said sensing device to cause the latter to serially scan the indicia and provide an output train of electric pulses each representative of a "1" or a "0" for the corresponding spot of the indicia, a shifting register having a digit capacity equal to said predetermined number for receiving and storing said train of pulses, a selector device for electrically representing a "1" or "0" in corresponding digit places having a "0" and a "1," respectively, of the coded indicia on facsimiles to be located, circuits for comparing each corresponding stored and represented digit values and supplying a "1" output when either or both is "1," means momentarily operative in response to filling of said shifting register for terminating the feeding only if all of said comparing circuits then provide a "1" output, and means responsive to the filling of said shifting register for resetting the latter after a predetermined time delay.

7. A searching system for automatically locating predetermined ones of a plurality of reduced-size document facsimiles comprising, in combination, a film strip having a plurality of frames each photographically recording one of the documents, a narrow longitudinal magnetic track on said strip having magnetically recorded binary digital "word" indicia in predetermined positional relation to each frame with a predetermined number of digits spaced longitudinally of the track for identifying the contents of the document recorded on that frame according to a predetermined code, a sensing device including means to produce an output train of time-spaced serial electric pulses representative of a "1" or a "0" in corresponding digit places of the indicia in response to longitudinal movement of said track thereby, a drive means longitudinally feeding said strip past said sensing device, a shifting register for storing the pulse train and representing the "1's" and "0's" thereof by voltage levels, a selector device including means to electrically represent by voltage levels a binary "word" corresponding to the "word" for the particular frames to be located, a plurality of NOT circuits connected to receive the electrical representations for the respective digit places in said selector "word," a corresponding plurality of OR circuits each having two inputs, the first of which are connected to receive the outputs of respective ones of said NOT circuits and the second of which are connected to said shifting register to receive the voltage levels for the respective ones of the digit places represented by said shifting register, an AND circuit having a plurality of inputs connected to receive the outputs of all of said OR circuits, and means operative momentarily only in response to the reception of a complete "word" in said shifting register for de-energizing said drive means in response to an output signal from said AND circuit.

8. A searching system for automatically locating selected ones of a plurality of recorded documents comprising, in combination, a film strip having a plurality of frames each photographically recording one of the documents, a narrow track of magnetic material disposed along one longitudinal edge of said strip and having recorded binary digital "word" indicia identifying the document recorded in each frame according to a predetermined code, a magnetic pick-up head for producing a train of serial, time-spaced electrical pulses representative of a "1" or a "0" in the corresponding digit place of the binary indicia "words" in response to longitudinal movement of said track thereby, a drive means for longitudinally feeding said strip past said pick-up head, a shifting register having a storage unit for each digit place in the indicia "words" for storing the pulse train by electrically representing a "1" or a "0" in the corresponding digit places by relatively high or low voltage potentials, a selector device including means for electrically representing by relatively high or low voltage potentials the presence of a "1" or "0" in each of the digit places of a plural place binary "word" corresponding to the code "word" identifying the particular documents to be selected, a plurality of voltage-inverting NOT circuits having input terminals connected to receive the potentials for the respective digit places in said selector device, a corresponding plurality of OR circuits each having two input terminals and an output terminal which assumes a potential representative of "1" only if either or both of the input terminals receives a potential representative of "1," means connecting one of the input terminals of each said OR circuit to receive the output of a corresponding one of said NOT circuits, means connecting the other of said input terminals of each said OR circuit to said shifting register to receive the potential from said shifting register for the corresponding digit place, an AND circuit having a plurality of input terminals connected respectively to the output terminals of said OR circuits, and means jointly responsive to said shifting register receiving a complete "word" and an output signal from said AND circuit for de-energizing said drive means.

References Cited in the file of this patent

UNITED STATES PATENTS

| | | |
|---|---|---|
| 2,124,906 | Bryce | July 26, 1938 |
| 2,224,646 | Friedman | Dec. 10, 1940 |
| 2,295,000 | Morse | Sept. 8, 1942 |
| 2,427,383 | Bryce | Sept. 16, 1947 |
| 2,482,242 | Boustman | Sept. 20, 1949 |
| 2,501,821 | Konzminc | Mar. 28, 1950 |
| 2,533,326 | Putt | Dec. 12, 1950 |
| 2,539,043 | Verneaux | Jan. 23, 1951 |
| 2,609,050 | Roth | Sept. 2, 1952 |
| 2,615,127 | Edwards | Oct. 21, 1952 |
| 2,641,696 | Woolard | June 9, 1953 |
| 2,721,990 | McNaney | Oct. 25, 1955 |
| 2,776,418 | Townsend | Jan. 1, 1957 |

FOREIGN PATENTS

| | | |
|---|---|---|
| 150,406 | Australia | Mar. 5, 1953 |